US012230015B2

(12) United States Patent
Huang et al.

(10) Patent No.: US 12,230,015 B2
(45) Date of Patent: Feb. 18, 2025

(54) FINE-LEVEL FACE ALIGNMENT THROUGH ANCHOR AND CONTOUR ESTIMATIONS

(71) Applicant: SRI International, Menlo Park, CA (US)

(72) Inventors: Jihua Huang, Sunnyvale, CA (US); Amir Tamrakar, Princeton, NJ (US)

(73) Assignee: SRI International, Menlo Park, CA (US)

(*) Notice: Subject to any disclaimer, the term of this patent is extended or adjusted under 35 U.S.C. 154(b) by 317 days.

(21) Appl. No.: 17/654,956

(22) Filed: Mar. 15, 2022

(65) Prior Publication Data

US 2022/0301290 A1 Sep. 22, 2022

Related U.S. Application Data (60) Provisional application No. 63/161,874, filed on Mar. 16, 2021.

(51) Int. Cl.
*G06V 10/776* (2022.01)
*G06T 7/64* (2017.01)
(Continued)

(52) U.S. Cl.
CPC ............ *G06V 10/776* (2022.01); *G06T 7/64* (2017.01); *G06T 7/73* (2017.01); *G06V 10/751* (2022.01);
(Continued)

(58) Field of Classification Search
CPC ............ G06V 10/776; G06V 10/751; G06V 10/7747; G06V 40/161; G06V 40/172;
(Continued)

(56) References Cited

U.S. PATENT DOCUMENTS

2008/0310759 A1* 12/2008 Liu .................. G06V 10/7557
382/294
2016/0055368 A1* 2/2016 Cao .................. G06F 18/2431
382/195
(Continued)

OTHER PUBLICATIONS

Wenyan (Wayne) Wu, Chen Qian, Shuo Yang, Quan Wang, Yici Cai, and Qiang Zhou: "Look at Boundary: A Boundary-Aware Face Alignment Algorithm"; 2018; In Proceedings of the IEEE conference on computer vision and pattern recognition, pp. 2129-2138. (Year: 2018).*

(Continued)

*Primary Examiner* — Siamak Harandi
(74) *Attorney, Agent, or Firm* — Shumaker & Sieffert, P.A.

(57) ABSTRACT

This disclosure describes techniques for improving accuracy of machine learning systems in facial recognition. The techniques include generating, from a training image comprising a plurality of pixels and labeled with a plurality of facial landmarks, one or more facial contour heatmaps, wherein each of the one or more facial contour heatmaps depicts an estimate of a location of one or more facial contours within the training image. Techniques further include training a machine learning model to process the one or more facial contour heatmaps to predict the location of the one or more facial contours within the training image, wherein training the machine learning model comprises applying a loss function to minimize a distance between the predicted location of the one or more facial contours within the training image and corresponding contour data generated from facial landmarks of the plurality of facial landmarks with which the training image is labeled.

20 Claims, 8 Drawing Sheets

(51) Int. Cl.
  *G06T 7/73* (2017.01)
  *G06V 10/75* (2022.01)
  *G06V 10/774* (2022.01)
  *G06V 40/16* (2022.01)

(52) U.S. Cl.
  CPC ........ *G06V 10/7747* (2022.01); *G06V 40/161* (2022.01); *G06V 40/172* (2022.01); *G06T 2207/20081* (2013.01); *G06T 2207/30201* (2013.01)

(58) Field of Classification Search
  CPC ........... G06V 40/168; G06T 7/64; G06T 7/73; G06T 2207/20081; G06T 2207/30201
  See application file for complete search history.

(56) References Cited

U.S. PATENT DOCUMENTS

| | | | |
|---|---|---|---|
| 2016/0140383 A1* | 5/2016 | Kim | G06V 10/56 382/118 |
| 2022/0156951 A1* | 5/2022 | Xu | G06V 40/161 |

OTHER PUBLICATIONS

"FaceGen Frequently Asked Questions", Retrieved from: https://web.archive.org/web/20210126013246/https:/facegen.com/faq.htm, Jan. 26, 2021, 2 pp.
"FaceGen Modeller Create realistic animatable 3D face & head meshes", Retrieved from: https://web.archive.org/web/20210125180017/https:/facegen.com/modeller.htm, Jan. 25, 2021, 6 pp.
"FaceGen Modeller Manual", Retrieved from: https://web.archive.org/web/20161203234207/http:/facegen.com/modeller_manual.htm, Dec. 3, 2016, 2 pp.
"FaceGen Modeller Model Sets", Retrieved from: https://web.archive.org/web/20160809112508/http:/facegen.com:80/modeller_sets.htm, Aug. 9, 2016, 2 pp.
Agarwal et al., "Protecting World Leaders Against Deep Fakes", vol. 1, CVPR Workshops, Jun. 16, 2019, pp. 38-45.
Aldrian et al., "Inverse Rendering of Faces with a 3D Morphable Model", vol. 35, No. 5, IEEE, Sep. 26, 2012, p. 1080-1093.
Bas et al., "Fitting a 3D Morphable Model to Edges: A Comparison Between Hard and Soft Correspondences", Asian Conference on Computer Vision, Oct. 7, 2016, pp. 377-391.
Blanz et al., "A Morphable Model For The Synthesis Of 3D Faces", Proceedings of the 26th annual conference on Computer graphics and interactive techniques, Jul. 1, 1999, 8 pp.
Bulat et al., "How Far are We from Solving the 2D & 3D Face Alignment Problem? (and a Dataset of 230,000 3D Facial Landmarks)", IEEE, Oct. 22, 2017, pp. 1021-1030.
Chen et al., "Face Alignment With Kernel Density Deep Neural Network", IEEE, Oct. 27, 2019, pp. 6992-7002.
Cootes et al., "Active Appearance Models", vol. 23, No. 6, IEEE, Jun. 2001, pp. 681-685.
Cootes et al., "Active Shape Models—'Smart Snakes'", Proceedings of the British Machine Vision Conference, Sep. 22, 1992, p. 266-275.
Cootes et al., "Active Shape Models-Their Training and Application", vol. 61, No. 1, Computer Vision and Image Understanding, Jan. 1995, pp. 38-59.
Cootes et al., "Robust and Accurate Shape Model Fitting Using Random Forest Regression Voting", vol. 7578, European Conference on Computer Vision, Oct. 7, 2012, pp. 278-291.
Deng et al., "Joint Multi-view Face Alignment in the Wild", vol. 28, No. 7, IEEE, Feb. 13, 2019, pp. 3636-3648.
Dong et al., "Style Aggregated Network for Facial Landmark Detection", IEEE, Jun. 18, 2018, pp. 379-388.
Feng et al., "Cascaded Collaborative Regression for Robust Facial Landmark Detection Trained Using a Mixture of Synthetic and Real Images With Dynamic Weighting", vol. 24, No. 11, IEEE, Jun. 17, 2015, pp. 3425-3440.
Feng et al., "Wing Loss for Robust Facial Landmark Localisation With Convolutional Neural Networks", IEEE, Jun. 18, 2018, pp. 2235-2245.
Freeman et al., "The Design and Use of Steerable Filters", vol. 136, No. 9, Sep. 1991, pp. 891-906.
Griffin et al., "Caltech-256 Object Category Dataset", CaltechAuthors, Apr. 19, 2007, 20 pp.
Gundavarapu et al., "Structured Aleatoric Uncertainty in Human Pose Estimation", IEEE, Jun. 19, 2019, pp. 50-53.
Huang et al., "ACE-Net: Fine-Level Face Alignment through Anchors and Contours Estimation", arxiv, Dec. 2, 2020, 12 pp.
Huang et al., "PropagationNet: Propagate Points to Curve to Learn Structure Information", IEEE, Jun. 13, 2020, pp. 7265-7274.
Jang et al., "Lip Reading Using Committee Networks With Two Different Types of Concatenated Frame Images", IEEE, Jul. 8, 2019, p. 90125-90131.
Jha et al., "Word Spotting in Silent Lip Videos", IEEE, Mar. 12, 2018, 10 pp.
Kingma et al., "Adam: A Method for Stochastic Optimization", arXiv preprint arXiv:14126980, Dec. 22, 2014, 9 pp.
Koestinger et al., "Annotated Facial Landmarks in the Wild: A large-scale, real-world database for facial landmark localization", IEEE, Nov. 6, 2011, 8 pp.
Kumar et al., "LUVLi Face Alignment: Estimating Landmarks' Location, Uncertainty, and Visibility Likelihood", IEEE, Jun. 13, 2020, pp. 8236-8246.
Le et al., "Interactive Facial Feature Localization", vol. 7574, European Conference on Computer Vision, Oct. 7, 2012, 14 pp.
Lin et al., "Face Parsing With RoI Tanh-Warping", IEEE, Jun. 15, 2019, pp. 5654-5663.
Liu et al., "Face Parsing via Recurrent Propagation", British Machine Vision Conference, Sep. 2017, 12 pp.
Liu et al., "Multi-Objective Convolutional Learning for Face Labeling", IEEE, Jun. 7, 2015, pp. 3451-3459.
Lv et al., "A Deep Regression Architecture With Two-Stage Re-Initialization for High Performance Facial Landmark Detection", IEEE, Jul. 21, 2017, pp. 3317-3326.
Morrone et al., "Face Landmark-based Speaker-independent Audio-visual Speech Enhancement in Multi-talker Environments", IEEE, May 12, 2019, 5 pp.
Newell et al., "Stacked Hourglass Networks for Human Pose Estimation", European Conference on Computer Vision, Jul. 2016, 17 pp.
Sagonas et al., "300 Faces in-the-Wild Challenge: The First Facial Landmark Localization Challenge", IEEE, Dec. 1, 2013, p. 397-403.
Sanyal et al., "Learning to Regress 3D Face Shape and Expression From an Image Without 3D Supervision", IEEE, Jun. 16, 2016, p. 7763-7772.
Saragih et al., "A Nonlinear Discriminative Approach to AAM Fitting", IEEE, Oct. 14, 2007, 8 pp.
Saragih et al., "Deformable Model Fitting by Regularized Landmark Mean-Shift", International Journal of Computer Vision, Sep. 25, 2010, p. 200-215.
Sauer et al., "Accurate Regression Procedures for Active Appearance Models", British Machine Vision Conference, Sep. 29, 2011, 11 pp.
Sun et al., "Deep Convolutional Network Cascade for Facial Point Detection", IEEE, Jun. 23, 2013, pp. 3476-3483.
Tang et al., "Quantized Densely Connected U-Nets for Efficient Landmark Localization", European Conference on Computer Vision, Sep. 8, 2018, 16 pp.
Tang et al., "Towards Efficient U-Nets: A Coupled and Quantized Approach", Mar. 26, 2019, 13pp.
Toshev et al., "DeepPose: Human Pose Estimation via Deep Neural Networks", IEEE, Aug. 2014, 9 pp.
Tran et al., "Regressing Robust and Discriminative 3D Morphable Models with a very Deep Neural Network", IEEE, Jul. 21, 2017, pp. 5163-5172.
Trigeorgis et al., "Mnemonic Descent Method: A Recurrent Process Applied for End-to-End Face Alignment", IEEE, Jun. 2016, pp. 4177-4187.

(56) References Cited

OTHER PUBLICATIONS

Valle et al., "Face Alignment using a 3D Deeply-initialized Ensemble of Regression Trees", Feb. 15, 2019, 23 pp.
Wang et al., "Adaptive Wing Loss for Robust Face Alignment via Heatmap Regression", IEEE, Apr. 16, 2019, pp. 6971-6981.
Wei et al., "Convolutional Pose Machines", IEEE, Jan. 30, 2016, pp. 4724-4732.
Wu et al., "Look at Boundary: A Boundary-Aware Face Alignment Algorithm", IEEE, May 26, 2018, pp. 2129-2138.
Xiong et al., "Supervised Descent Method and its Applications to Face Alignment", IEEE, Jun. 23, 2013, pp. 532-539.
Yang et al., "Stacked Hourglass Network for Robust Facial Landmark Localisation", IEEE, Jul. 1, 2017, pp. 79-87.
Zhang et al., "Coarse-to-Fine Auto-Encoder Networks (CFAN) for Real-Time Face Alignment", European Conference on Computer Vision, Sep. 6, 2014, pp. 1-16.
Zhou et al., "Extensive Facial Landmark Localization with Coarse-to-fine Convolutional Network Cascade", IEEE, Dec. 2, 2013, pp. 386-391.
Zhou et al., "Face Parsing via a Fully-Convolutional Continuous CRF Neural Network", arXiv:1708.03736v1, Aug. 12, 2017, 10 pp.
Zhou et al., "Interlinked Convolutional Neural Networks for Face Parsing", arXiv:1806.02479v1, Oct. 15, 2015, pp. 222-231.
Zhu et al., "ReDA:Reinforced Differentiable Attribute for 3D Face Reconstruction", IEEE/CVF, Jun. 1, 2020, pp. 4958-4967.

\* cited by examiner

FINE-LEVEL FACE ALIGNMENT THROUGH ANCHOR AND CONTOUR ESTIMATIONS

This application claims the benefit of U.S. Provisional Application No. 63/161,874, which was filed on Mar. 16, 2021, the entire content of which is incorporated herein by reference.

TECHNICAL FIELD

This disclosure generally relates to machine learning systems.

BACKGROUND

Machine learning systems may be used to process images to generate various data associated with an image. For example, a machine learning system may process the image to identify one or more landmarks associated with features in the image, such as landmarks associated with a face in a facial recognition system. Some machine learning systems may apply a trained machine learning model, such as a convolutional neural network model, to process images for facial recognition, such as identifying facial landmarks. Machine learning systems generally require a large amount of "training data" to build an accurate model. However, once trained, machine learning systems may be able to perform a wide variety of image-recognition tasks beyond what is capable by a human being.

SUMMARY

In general, techniques are described for training a machine learning model to perform facial alignment tasks based on facial landmarks and facial anchors to improve the accuracy of machine learning systems in facial recognition. For example, a machine learning system may generate, from a training image, facial contour heatmaps that depict an estimate of locations of facial contours within the training image. The machine learning system may train a machine learning model to process the facial contour heatmaps to predict the locations of the facial contours within the training image. Training the machine learning model to predict the locations of the facial contours includes applying a loss function to minimize a distance between the predicted locations of the facial contours within the training image and corresponding facial contour data generated from the labeled training image.

Similarly, the machine learning system may generate, from a training image, facial anchor heatmaps that depict an estimate of locations of facial anchors within the training image. The machine learning system may train a machine learning model to process the facial anchor heatmaps to predict the locations of the facial anchors within the training image. Training the machine learning model to predict the locations of the facial anchors includes applying a loss function to minimize a distance between the predicted locations of the facial anchors within the training image and corresponding facial anchor data generated from the labeled training image.

The techniques of the disclosure may provide specific improvements to the computer-related fields of machine learning and facial recognition that have practical applications. For example, improvements in facial analysis that rely upon fine-level alignment, such as improved face mesh reconstruction may assist users (e.g., law enforcement agencies) in the application of detecting deepfake images. Deepfakes are synthetic media in which a person in an existing image or video is replaced with someone else's likeness. In another example, improvements in and tracking of facial features includes improved facial behavior modeling for visual speech recognition, such as in the application of audio visual speech recognition (AVSR) that uses image processing capabilities in lip reading to aid speech recognition systems.

In one example, this disclosure describes a system for performing facial alignment tasks, the system includes an input device configured to receive a training image comprising a plurality of pixels, wherein the training image is labeled with a plurality of facial landmarks. The system further includes a computation engine comprising processing circuitry for executing a machine learning system, wherein the machine learning system is configured to generate, from the training image, one or more facial contour heatmaps, wherein each of the one or more facial contour heatmaps depicts an estimate of a location of one or more facial contours within the training image. The machine learning system may also be configured to train a machine learning model to process the one or more facial contour heatmaps to predict the location of the one or more facial contours within the training image, wherein training the machine learning model comprises applying a loss function to minimize a distance between the predicted location of the one or more facial contours within the training image and corresponding contour data generated from facial landmarks of the plurality of facial landmarks with which the training image is labeled to improve an accuracy of the machine learning system in facial recognition.

In another example, this disclosure describes a method for performing facial alignment tasks. The method includes receiving, by a computing device, a training image comprising a plurality of pixels, wherein the training image is labeled with a plurality of facial landmarks, and generating, by the computing device, from the training image, one or more facial contour heatmaps. Each of the one or more facial contour heatmaps depicts an estimate of a location of one or more facial contours within the training image. The method further includes training, by the computing device, a machine learning model to process the one or more facial contour heatmaps to predict the location of the one or more facial contours within the training image, wherein training the machine learning model comprises applying a loss function to minimize a distance between the predicted location of the one or more facial contours within the training image and corresponding contour data generated from facial landmarks of the plurality of facial landmarks with which the training image is labeled to improve an accuracy of the machine learning system in facial recognition.

In another example, this disclosure describes a method including receiving, by a computing device, an input image comprising a plurality of pixels; and generating, by the computing device, from the input image, one or more facial contour heatmaps, wherein each of the one or more facial contour heatmaps depicts an estimate of a location of one or more facial contours within the input image, and processing, by a machine learning model, the one or more facial contour heatmaps to predict a location of the one or more facial contours within the input image. The machine learning model may be trained by processing one or more training image facial contour heatmaps to predict a location of one or more training image facial contours within a training image and applying a loss function to minimize a distance between a predicted location of the one or more training image facial contours within the training image and corresponding contour data generated from facial landmarks of a plurality of facial landmarks with which the training image is labeled to improve an accuracy of the machine learning system in facial recognition.

In another example, this disclosure describes a non-transitory, computer-readable medium comprising instructions for causing one or more programmable processors to generate, from a training image comprising a plurality of pixels and labeled with a plurality of facial landmarks, one or more facial contour heatmaps, wherein each of the one or more facial contour heatmaps depicts an estimate of a location of one or more facial contours within the training image, and train a machine learning model to process the one or more facial contour heatmaps to predict the location of the one or more facial contours within the training image, wherein training the machine learning model comprises applying a loss function to minimize a distance between the predicted location of the one or more facial contours within the training image and corresponding contour data generated from facial landmarks of the plurality of facial landmarks with which the training image is labeled to improve an accuracy of the machine learning system in facial recognition.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Face alignment is the basis for various types of face analysis such as face mesh reconstruction facial behavior modeling for deepfake detection and visual speech recognition, where fine-level alignment and tracking is crucial. Existing approaches use only facial landmarks to perform face alignment. However, there are issues with a facial landmark-only representation. First, only a small subset of landmarks is well defined and can be localized accurately, such as eye corners. This well-defined subset of landmarks is referred to as anchors. The rest of the landmarks are discrete points sampled along various facial contours and are called contour landmarks that have positions ambiguous along the contours. Second, current implementations of facial landmarks definitions are not dense enough to capture fine-level details of facial contours, and third, current facial landmarks definitions are inconsistent across existing datasets used to train machine learning models.

In one example advantage, the techniques described herein provide better and more accurate constraints for alignment, for example when fitting meshes (e.g., a 3D model of a face). A new anchor and contour landmark representation would typically require reannotation of the training datasets with the new representation to generate the necessary training data for the new model. However, another example advantage includes using a weakly supervised loss that forces predicted anchors and contours to pass through existing annotated facial landmarks allowing for the option to use of existing training data sets. Because the ML model is independent of the specific landmarks definitions an additional example advantage is the ability to use a multitude of different dataset types, for example, a 36-landmarks-based weak supervision dataset or a 68-landmarks-based weak supervision dataset. In another example advantage, accuracy of the contour localizations in the spaces between landmarks is further improved by augmenting the training of the ML model using synthetic data that provides contours for full supervision.

Figure 1:
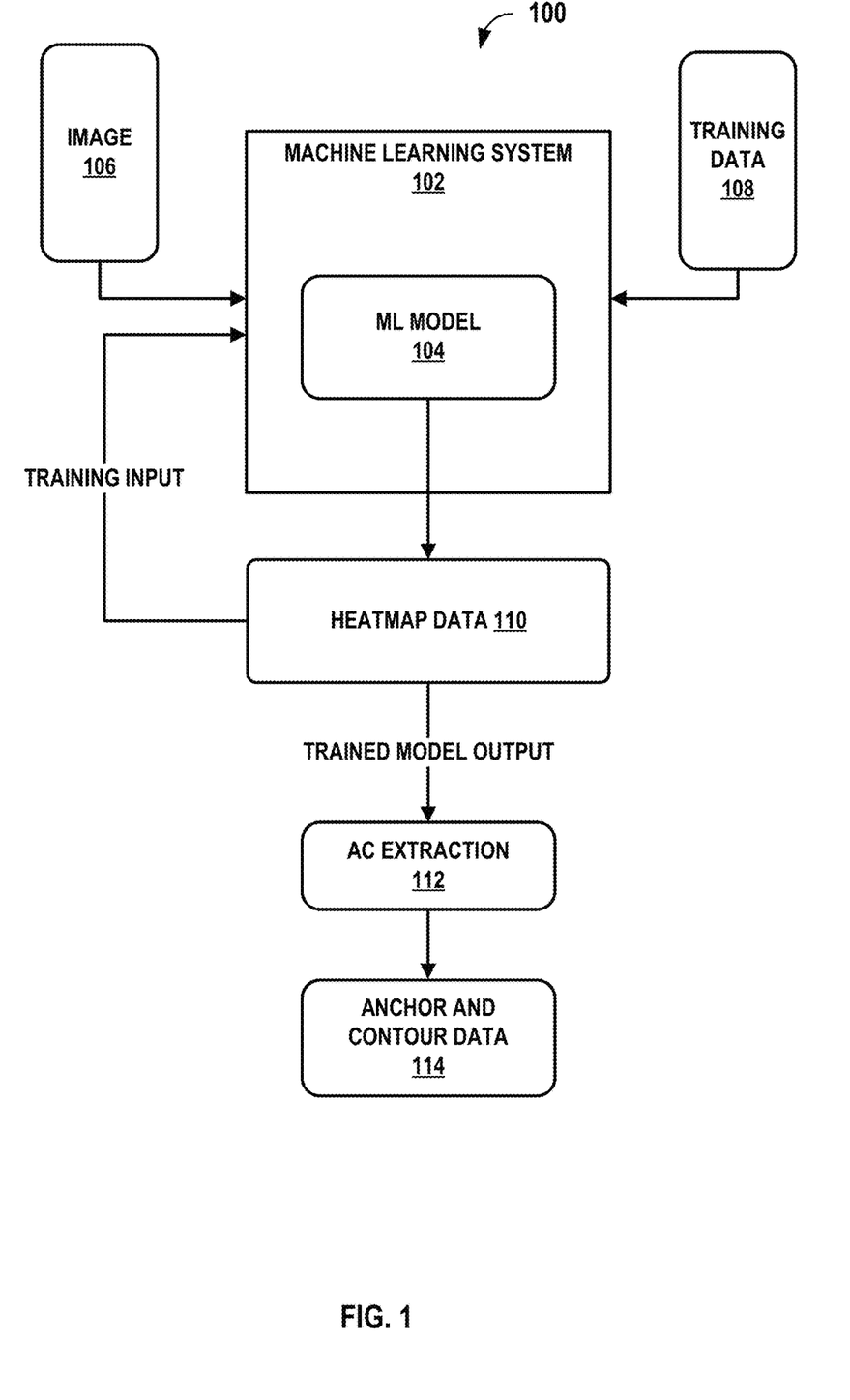
FIG. 1 is a block diagram illustrating an example system for performing facial alignment tasks to improve the accuracy of a machine learning system in facial recognition in accordance with the techniques of the disclosure.

FIG. 1 is a block diagram illustrating an example system 100 for performing facial alignment tasks to improve the accuracy of a machine learning system in facial recognition in accordance with the techniques of the disclosure. As shown, the system 100 includes machine learning (ML) system 102 that includes an ML model 104, image 106, training data 108, and heatmap data 110. In one example, training data 108 may include training images having a multitude of pixels where each training image is labeled with facial landmarks.

During training, ML system 102 may receive a training image from training data 108 and generate heatmap data 110, for example, (training image) facial contour heatmaps. The facial contour heatmaps depict an estimate of where the (training image) facial contours are on the training image. In one example, ML model 104 processes the facial contour heatmaps (e.g., from heatmap data 110) to predict locations for the facial contours within the training image. ML system 102 may train the machine learning model by applying a first loss function to minimize a distance between the predicted location of the one or more facial contours within the training image and corresponding contour data generated from the labeled facial landmarks from the training image.

In another example, ML system 102 may generate, from the training image, heatmap data 110 that includes facial anchor heatmaps. The facial anchor heatmaps depict an estimate of a location of one or more facial anchors within the training image. In one example, ML model 104 processes the facial anchor heatmaps (e.g., from heatmap data 110) to predict locations for the facial anchors within the training image. ML system 102 may train the machine learning model by applying a second loss function to minimize a distance between the predicted location of the facial anchors within the training image and corresponding facial landmarks generated from the labeled training image.

In one example, once the model is trained, image 106 (e.g., a facial image) may be input into ML model 104 of the machine learning system 102 to generate heatmap data 110 including anchor and contour heatmaps. The anchor and contour heatmaps may be received by anchor and contour (AC) extraction 112. In one example, AC extraction 112 generates anchor and contour data 114 by converting each facial anchor heatmap into a two-dimensional anchor positions on the image and each contour heatmap into line contours that pass through one or more of the two-dimensional anchor positions, for example, as fitted parabolas between image landmarks, and may overlay this data on to the image 106 with improved anchor and contour accuracy over conventional systems.

Figure 2:
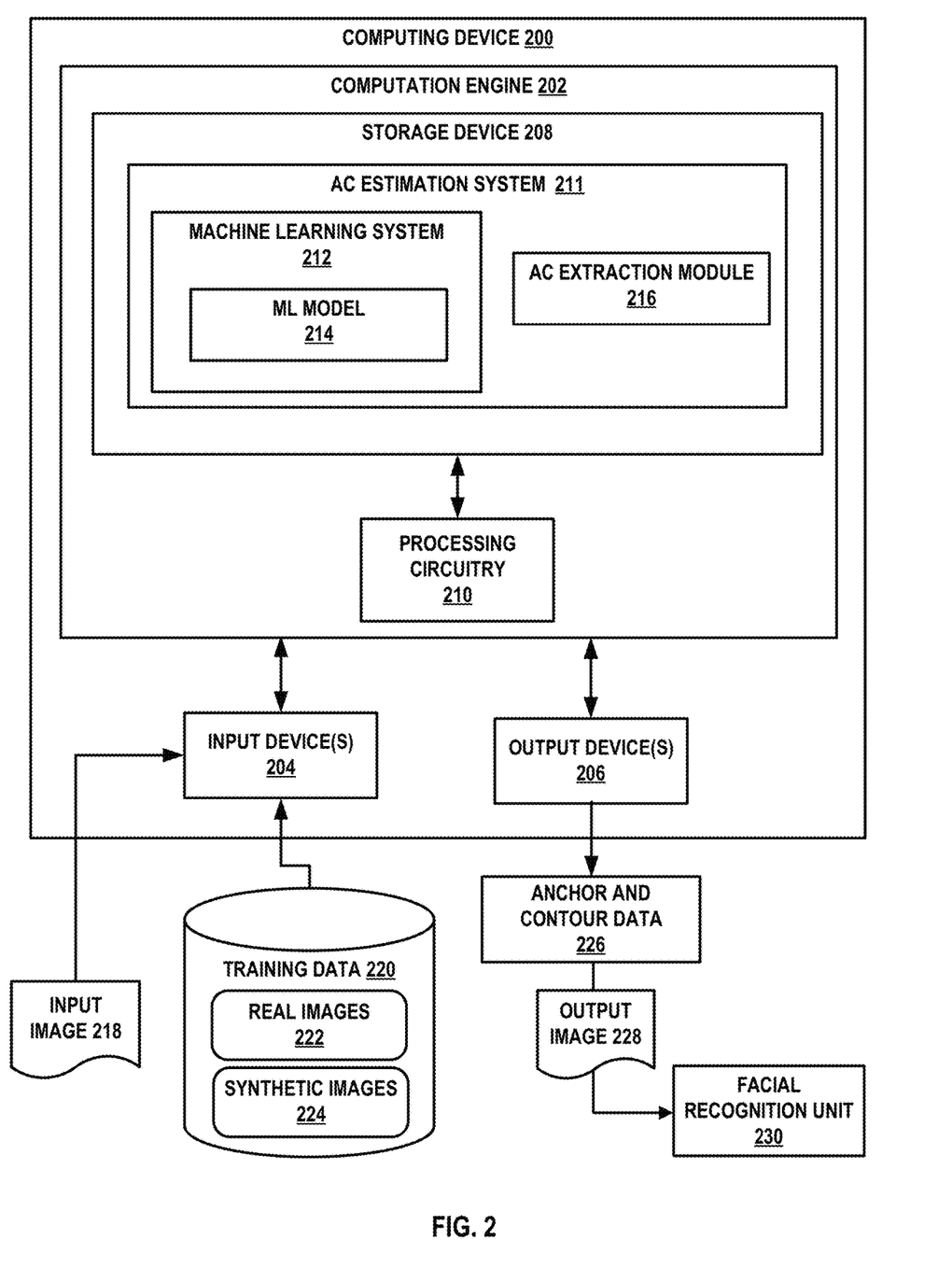
FIG. 2 is a block diagram illustrating example computing device for performing facial alignment tasks to improve the accuracy of a machine learning system for facial recognition in accordance with techniques of the disclosure.

FIG. 2 is a block diagram illustrating example computing device 200 for performing facial alignment tasks to improve the accuracy of a machine learning system for facial recognition in accordance with techniques of the disclosure. Computing device 200 may be implemented as any suitable computing system, such as one or more server computers, workstations, laptops, mainframes, appliances, cloud computing systems, smart phones, tablet computers, and/or other computing systems that may be capable of performing operations and/or functions described in accordance with one or more aspects of the present disclosure. In some examples, computing device 200 may represent a cloud computing system, server farm, and/or server cluster (or portion thereof) that provides services to client devices and other devices or systems (not shown). In other examples, computing device 200 may represent or be implemented through one or more virtualized compute instances (e.g., virtual machines, containers, etc.) of a data center, cloud computing system, server farm, and/or server cluster. Components of computing device 200 may be distributed across one or more compute nodes, storage nodes, application nodes, web servers, or other computing devices, or distributed across a network, such as the Internet, another public or private communications network, for instance, broadband, cellular, Wi-Fi, and/or other types of communication networks, for transmitting data between computing systems, servers, and computing devices.

In the example of FIG. 2, computing device 200 includes computation engine 202, one or more input devices 204, and one or more output devices 206. Computation engine 202 includes storage device(s) 208 and processing circuitry 210. One or more storage devices 208 may be configured to store information, such executable code associated with anchor and contour (AC) estimation system 211 that includes, for example, machine learning system 212 and AC extraction module 216 during operation of computing device 200. Processing circuitry 210 may configured to process instructions and executable code to implement the functionality of AC estimation system 211, including machine learning system 212 and AC extraction module 216.

Processing circuitry 210 may include any one or more of a microprocessor, a controller, a digital signal processor (DSP), an application specific integrated circuit (ASIC), a field-programmable gate array (FPGA), or equivalent discrete or integrated logic circuitry. Storage devices 208 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them.

In the example of FIG. 2, computing device 200 may receive, through one or more input devices 204, training data 220 that may include real images 222 and synthetic images 224. In some examples, all or some of the training data 200 may be received from a user of computing device 200 or other system, such as a remote computer system connected over a network (not shown). Input devices 204 may include a keyboard, pointing device, voice responsive system, video camera, biometric detection/response system, button, sensor, mobile device, control pad, microphone, presence-sensitive screen, network, or any other type of device for detecting input from a human or machine.

In one example, machine learning (ML) model 214 is trained using real images 222 and synthetic images 224 from training data 220. Real images 222 are images that, in one example, are only annotated with ground truth (GT) landmark data. Synthetic images 224 are rendered from three-dimensional (3D) face meshes and thus the GT anchors and contours are available unlike real images 222 that may only have annotated GT landmarks. In one example, machine learning system 212 applies different loss functions with respect to synthetic data (e.g., synthetic images 224) and real data (e.g., real images 222) based on the different GT information available from each image type.

During training, machine learning system 212 generates heatmap data 110, for example, facial anchor heatmaps and facial contour heatmaps from GT data, such as GT landmarks and derived GT anchors (subsets of GT landmarks) and GT contours. An anchor, a, in accordance with the techniques of the disclosure, is point feature tied to well defined local features on the image (e.g., corners of the eyes or lips on a face). It is represented as a two-dimensional (2D) point, $(a_x, a_y)$, on an image. From GT anchor landmarks, anchor heatmaps are generated for training ML model 214. In one example, a heatmap, $H_a$, corresponding to an anchor a is defined as:

$$H_a(p) = \max\left(0, 1 - 2\frac{\|p - a\|^2}{\sigma^2}\right) \quad \text{(Eq. 1)}$$

where p is a pixel on the heatmap and a controls the width of the peak.

A contour, c, in accordance with the techniques of the disclosure, is a 2-d curve that maps to well-defined facial contours (e.g., eyelids and lips). The occluding contour on the face (outer boundary) is also represented as a facial contour despite the fact that these are related to the viewing direction and not tied to specific features on the face. The contour, c, is represented as a collection of sub-pixel line segments, $\{s_i\}$.

Similar to anchors, heatmaps are generated from contours for training ML model 214. A contour heatmap $H_c$ is define as:

$$H_c(p) = \max\left(0, 1 - 2\frac{dist(p, c)^2}{\sigma^2}\right) \quad \text{(Eq. 2)}$$

where p is any pixel on the heatmap, and dist(p, c) is a function measuring the minimum distance from point p to the contour c, specifically, the minimum distance between p and any of the line segments $s_i$ in c. In other examples other definitions of anchor heatmaps (e.g., Gaussian heatmaps) and contour heatmaps may be used, in accordance with the techniques of the disclosure.

Fully Supervised Training Using Synthetic Data

For the synthetic data (e.g., synthetic images 224), a fully supervised loss is used because complete GT anchors and contours are available. In one example, machine learning system 212 receives a training image made up of pixels. The synthetic training image may be labeled with facial landmarks and facial contours. Machine learning system 212 may generate, from the synthetic training image, one or more facial contour heatmaps. Each facial contour heatmaps may depict an estimate of a location of one or more second facial contours within the synthetic training image. Machine learning system 212 may apply a loss function to minimize a difference between the predicted location of the one or more second facial contours within the synthetic training image and corresponding locations of the facial landmarks and the facial contours with which the synthetic training image is labeled.

For example, for fully supervised training with synthetic data (e.g., synthetic images 224), for each image I, its anchors $A=\{a_1, a_2, \ldots, a_{N_A}\}$ and contours $C=\{c_1, c_2, \ldots, c_{N_C}\}$ are available. Machine learning system 212 generates ground truth AC heatmaps $H=\{H_a^1, \ldots, H_a^{N_A}, H_c^1, \ldots, H_c^{N_C}\}$ following Eq. 1 and Eq. 2, and the fully supervised Loss $\mathcal{L}$ for predicted heatmaps $\hat{H}$ as a weighted root mean square loss:

$$\mathcal{L}(H, \hat{H}) = \frac{1}{|H|}\sqrt{\sum W(H, \hat{H}) \cdot \|H - \hat{H}\|^2} \quad \text{(Eq. 3)}$$

where |H| is the total number of pixels in heatmaps H, is element-wise multiplication, and W is a weighting emphasizing positive and hard negative examples:

$$W(H,\hat{H})=1+(\alpha-1)\cdot\max(H,|H-\hat{H}|) \quad \text{(Eq. 4)}$$

The weighting ($W_h$) in this example accounts for a number of the pixels in the heatmaps being background pixels without which ML model 214 may be trapped in a trivial local minimum, $\hat{H}=0$.

Weakly Supervised Training Using Real Images

In one example, a weakly supervised loss function is used for real data to train ML model 214 such that predicted contours pass through available annotated GT landmarks. In the weakly supervised setting, for each real image 222, I, only its landmarks, $L=\{l1, l2 \ldots l_{N_L}\}$, are available. In one example, a contourness score, C, may be determined and included in the contour data used to determine the weakly supervised contour loss, $\tilde{\mathcal{L}}$. The contourness score C may be indicative of a proximity of a facial contour of the one or more facial contours passing through the respective pixel of each of the one or more facial contour heatmaps.

Machine learning system 212 may calculate C by evaluating, for each heatmap H, whether a contour passes through a given pixel p on the heatmap H. As illustrated by the example equations below, the machine learning system 212 may compare each pixel of each of the one or more facial contour heatmaps to one or more heatmap templates, each of the one or more heatmap templates including a contour line orientation and a contour line width. The machine learning system 212 may calculate, based on the comparison, the contourness score for the respective pixel of each of the one or more facial contour heatmaps. For example, the calculation is based on an assumption that a contour is locally a straight line with orientation θ and width σ, machine learning system 212 constructs a corresponding heatmap template $T_{\sigma,\theta}$ based on Eq. 2:

$$T_{\sigma,\theta}(x, y) = \max\left(0, 1 - 2\frac{(y\cos\theta - x\sin\theta)^2}{\sigma^2}\right) \quad \text{(Eq. 5)}$$

Figure 3:
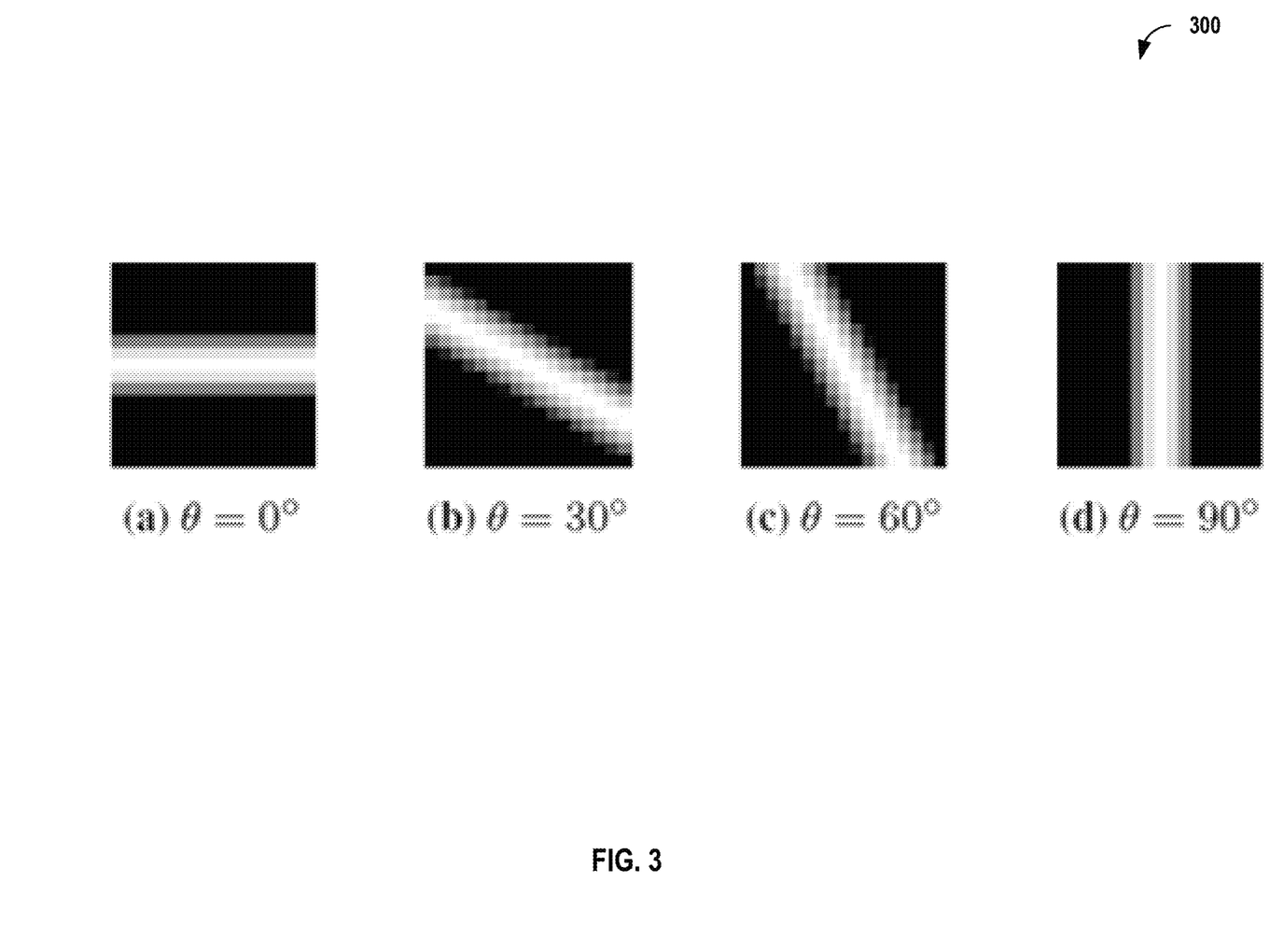
FIG. 3 illustrates heatmap templates generated by a machine learning model in accordance with the techniques of the disclosure.

FIG. 3 illustrates heatmap templates 300 generated by ML model 214 of FIG. 2 in accordance with the techniques of the disclosure. For example, FIG. 3 illustrates heatmap templates 300, $T_{\sigma,\theta}$, (a)-(d) where θ ranges from 0 to 90 degrees. If a contour passes through pixel p, then heatmap H cropped around p should match the heatmap template $T_{\sigma,\theta}$. Thus, based on template matching error, contourness score, C, is defined as $$C_\sigma(H, p) = -\min_\theta \sum_{i=-2\sigma}^{2\sigma}\sum_{j=-2\sigma}^{2\sigma} G_\sigma(i, j) \cdot \quad \text{(Eq. 6)}$$
$$\|H_+(p_x + i, p_y + j) - T_{\sigma,\theta}(i, j)\|^2$$

The negative sign at the front of Eq. 6 turns contourness C from an error to a score. $H_+=\max(0, H)$ is a non-negative clipping, and $G_\sigma(x, y)=e^{-(x^2+y^2)/\sigma^2}$ is the Gaussian weight. σ may be omitted in the subscripts since it is a constant hyper-parameter.

The optimization in Eq. 6 has a closed-form solution through the use of steerable filters [15]. Therefore, the contourness score, C(H), for all pixels on heatmap H may be efficiently computed with convolutions and integrated into loss functions. Apart from the contourness score map C(H), contour orientation map, O(H), may also be computed as the optimal θ in the closed-form solution to Eq. 6.

In one example, computation engine 202 using machine learning system 212 may use the contourness score C and GT landmarks from real data (e.g., real image 222) in the weakly supervised loss function to train ML model 214. Let $\tilde{c}$ include line-contour data created from a corresponding multitude of contour landmarks, $L_c$. $\tilde{c}$ (e.g., line-contour data) may be generated by connecting adjacent facial landmarks of the multitude of contour landmarks with straight lines or, in another example, generated by interpolating landmarks with splines. Let $\hat{H}$ be a predicted contour heatmap representing a predicted contour, $\hat{c}$.

In one example of a weakly supervised loss function three rules and their respective equations are enforced, the three rules include a landmark loss function, a line loss function, and a far loss function.

(Rule 1) The predicted contour ĉ must pass through all contour landmarks $L_c$. The contour data may include contour landmark data and the landmark loss function may be used to minimize a minimize a distance between the predicted location of the one or more facial contours and one or more line-contours of the line-contour data.

$$\tilde{\mathcal{L}}_{landmark}(\hat{H}) = \frac{1}{|L_c|}\sum_{l\in L_c} f(C(\hat{H}, l)) \quad \text{(Eq. 7)}$$

where $|L_c|$ is the total number of contour landmarks, and $f(\bullet)$ is a mapping function that converts contourness score to a loss in [0, 1] range.

(Rule 2) The predicted contour ĉ must be close to line-contour $\tilde{c}$. The contour data may include line-contour data and the line loss function may be used to minimize a distance between the predicted location of the one or more facial contours and one or more contour landmarks of the contour landmark data. In other words, for each pixel p on $\tilde{c}$, there must exist a pixel q on $\hat{c}$ such that q–p is the line-contour normal at p, and $\|p-q\| \leq D$ for some constant threshold D:

$$\tilde{\mathcal{L}}_{line}(\hat{H}) = \frac{1}{|\tilde{c}|} \sum_{p \, on \, \tilde{c}} f\left( \max_{-D \leq d \leq D} C(H, p + d \cdot N_{\tilde{c}}(p)) \right) \quad \text{(Eq. 8)}$$

where $|\tilde{c}|$ is the total number of pixels on $\tilde{c}$, $N_{\tilde{c}}$ is the normal map of line-contour $\tilde{c}$ and $N_{\tilde{c}}(p)$ is the line-contour normal at pixel p; and (Rule 3) Pixels far away from line-contour $\tilde{c}$ should have zero heat value. Contour data is indicative of a distance of a pixel of the one or more facial contour heatmaps from one or more line-contours. The far loss function may assign a heatmap value of zero to pixels of the one or more facial contour heatmaps corresponding to pixels of the multitude of pixels of the training image that are a distance greater than a threshold distance value (e.g., dist(p, $\tilde{c}$)) from the corresponding line-contour of the one or more line-contours.

$$\tilde{\mathcal{L}}_{far}(\hat{H}) = \frac{1}{|H|} \sqrt{\sum M(\tilde{c}) \cdot W(0, \hat{H}) \cdot \|\hat{H}\|^2} \quad \text{(Eq. 9)}$$

where $M(\tilde{c})$ is a binary mask selecting pixels far from $\tilde{c}$:

$$M(\tilde{c}, p) = \begin{cases} 1, & dist(p, \tilde{c}) > D \\ 0, & \text{otherwise} \end{cases} \quad \text{(Eq. 10)}$$

Eq. 9 follows $\mathcal{L}$ in Eq. 3 with ground truth being H=0. It only adds an extra mask $M(\tilde{c})$ to select pixels far from $\tilde{c}$.

Lastly, the weakly supervised contour loss $\tilde{\mathcal{L}}$ used by machine learning system 212 to train ML model 214 to predict locations of the one or more facial contours and one or more facial anchors of an image (e.g., input image 218) is the sum of the three losses above:

$$\tilde{\mathcal{L}} = \tilde{\mathcal{L}}_{far} + \lambda_{landmark} \cdot \tilde{\mathcal{L}}_{landmark} + \lambda_{line} \cdot \tilde{\mathcal{L}}_{line} \quad \text{(Eq. 11)}$$

where $\lambda_{landmark}$ and $\lambda_{line}$ are constant weights.

In another example, ML system 102 may generate, from the training image, heatmap data 110 that includes facial anchor heatmaps. The facial anchor heatmaps depict an estimate of a location of one or more facial anchors within the training image. In one example, ML model 104 processes the facial anchor heatmaps (e.g., from heatmap data 110) to predict locations for the facial anchors within the training image. ML system 102 may train the machine learning model by applying one or more loss functions (e.g., and one or more of $\tilde{\mathcal{L}}$ loss functions) to minimize a distance between the predicted location of the facial anchors within the training image and corresponding facial landmarks generated from the labeled training image.

In one example, returning to FIG. 2, the AC extraction module 216 receives each predicted anchor heatmap ($H_a$) and each contour heatmap, ($H_c$) from ML model 214 and converts the heatmap for an input image each $H_a$ to a 2D anchor position $a=(a_x, a_y)$, and each $H_c$ into a contour (see e.g., FIG. 6) to generate anchor and contour data 226. In one example, anchor and contour data 226 may be overlayed onto input image 218 to create output image 228. Output image 228 may be received by facial recognition unit 230 to perform facial recognition, to match the input image 218 against a database (not shown) of known images and corresponding identifying data. In one example, facial recognition unit 230 may be a component of computing device 200 or external to computing device 200, such as a cloud computing system or other remote computing system.

Figure 4:
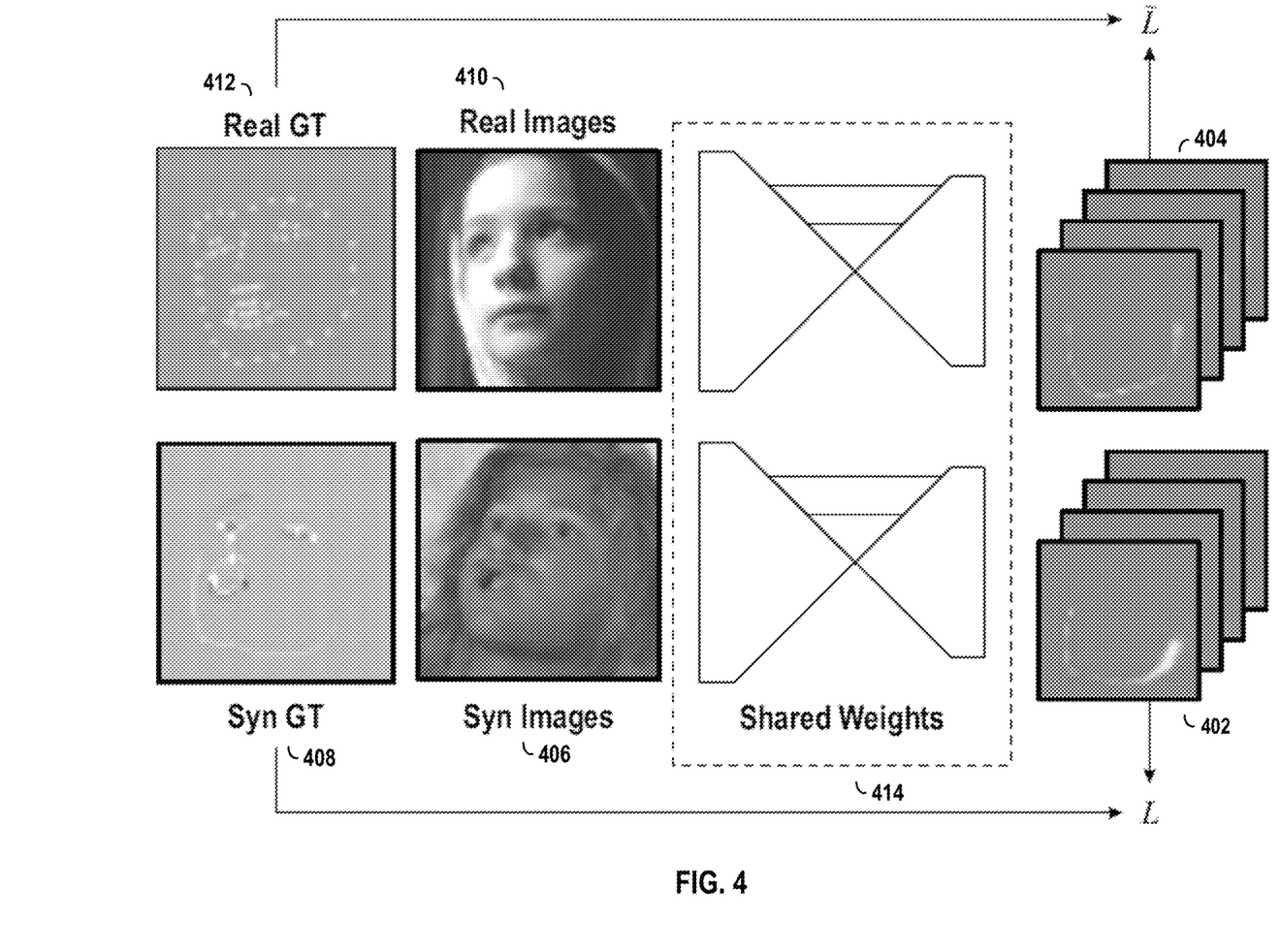
FIG. 4 is a block diagram illustrating training a machine learning model using loss functions in accordance with the techniques of the disclosure.

FIG. 4 is a block diagram illustrating training ML model 214 using loss functions $\mathcal{L}$ 402 and $\tilde{\mathcal{L}}$ 404 that may be generated with respect to techniques of the disclosure described in FIGS. 1-3. In one example, machine learning system 212 uses synthetic images 406 to generate heatmaps including synthetic GT anchors and GT contours that are used to compare against the predicted heatmap output from ML model 214 of anchors and contours as shown by $\mathcal{L}$ 402. Similarly, machine learning system 212 may use real images 410 to generate heatmaps including real GT landmarks and anchors that are used to compare against the predicted heatmap output from ML model 214 of anchors and contours as shown by $\tilde{\mathcal{L}}$ 404. In one example, each loss function $\mathcal{L}$ 402 and $\tilde{\mathcal{L}}$ 404 includes shared weights that may be adjusted to minimize a distance between the predicted location of the one or more facial contours and facial landmarks and the GT data within the labeled training data (e.g., synthetic images 406 and real images 410).

Figure 5:
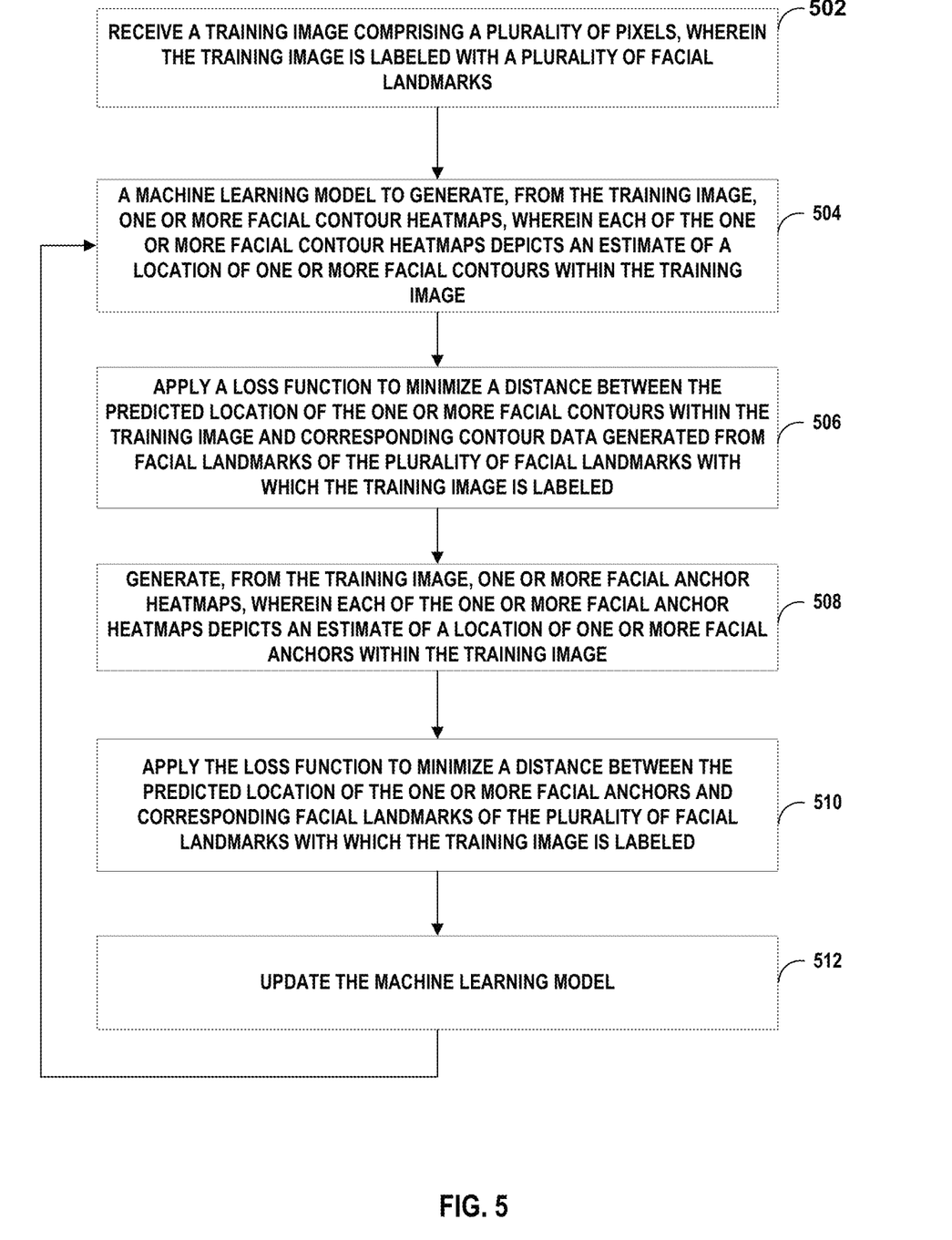
FIG. 5 is a flowchart illustrating an example operation for training ML model in accordance with the techniques of the disclosure.

FIG. 5 is a flowchart illustrating an example operation for training ML model 214 in accordance with the techniques of the disclosure. For convenience, FIG. 5 is described with respect to FIG. 2. machine learning system 212 receives a training image (e.g., real images 222 or synthetic images 224) comprising a plurality of pixels, wherein the training image is labeled with a plurality of facial landmarks (502). ML model 214 generates, from the training image, one or more facial contour heatmaps, wherein each of the one or more facial contour heatmaps depicts an estimate of a location of one or more facial contours within the training image (504). ML model 214 applies a loss function to minimize a distance between the predicted location of the one or more facial contours within the training image and corresponding contour data generated from facial landmarks of the plurality of facial landmarks with which the training image is labeled (506). ML model 214 generates, from the training image, one or more facial anchor heatmaps, wherein each of the one or more facial anchor heatmaps depicts an estimate of a location of one or more facial anchors within the training image (508). ML model 214 may apply the loss function to minimize a distance between the predicted location of the one or more facial anchors and corresponding facial landmarks of the plurality of facial landmarks with which the training image is labeled (510). machine learning system 212 updates the machine learning model (512) and returns to (504) to process again the training image.

In one example, this process is repeated until the loss function(s) meet a threshold value and the ML model is trained for that training image. In another example, a new training image is input into ML model 214 and the operation proceeds as described above until the ML model 214 is trained for that image. In examples, one or more or combination of loss functions may be associated with real images 222 or synthetic images 224, as described in accordance with the techniques of the disclosure.

Anchor and Contour (AC) Extraction

Figure 6:
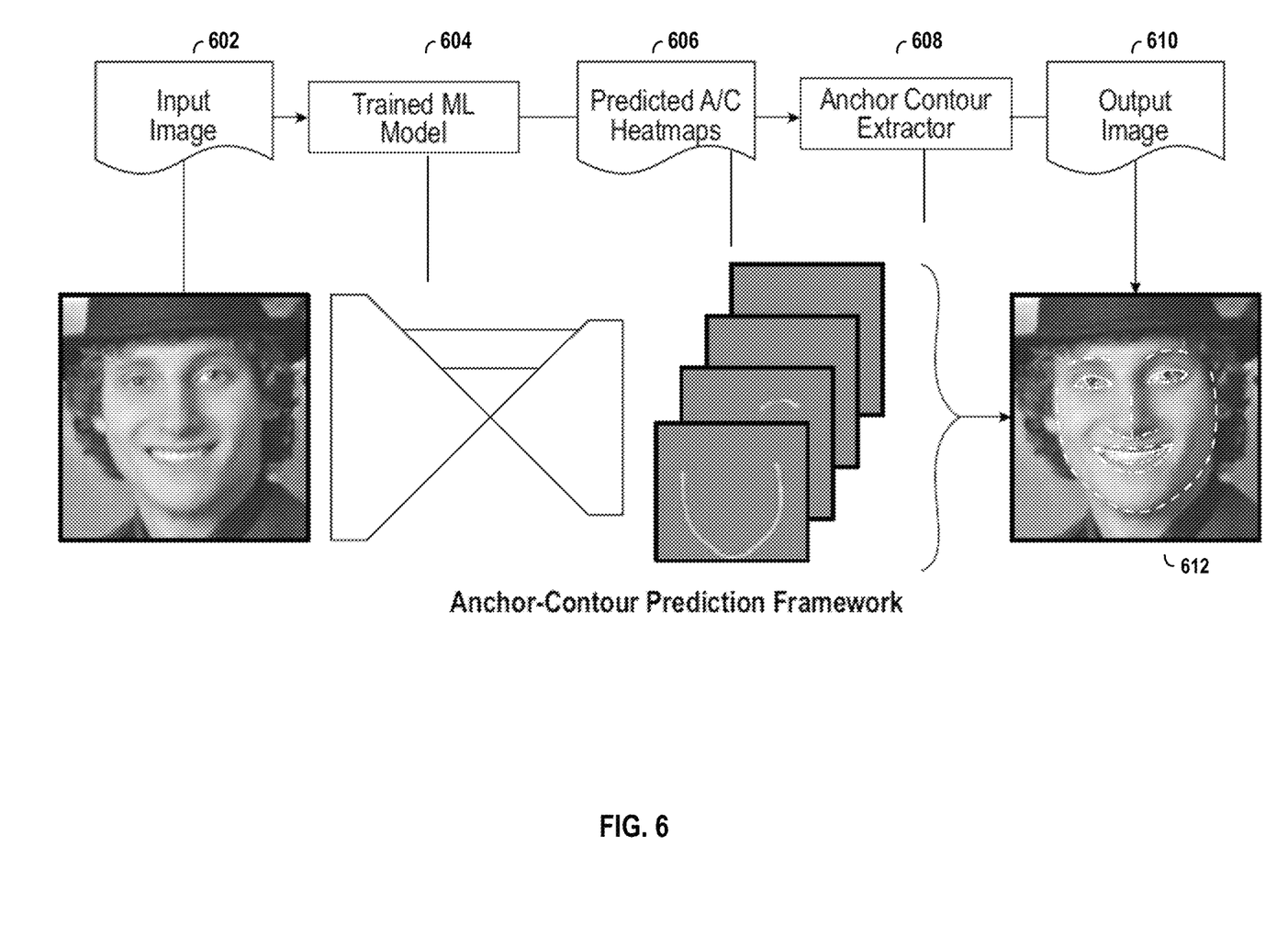
FIG. 6 is a block diagram illustrating use of a trained ML model to predict and extract facial anchors and facial contours from an input image in accordance with techniques of the disclosure.
Figure 7:
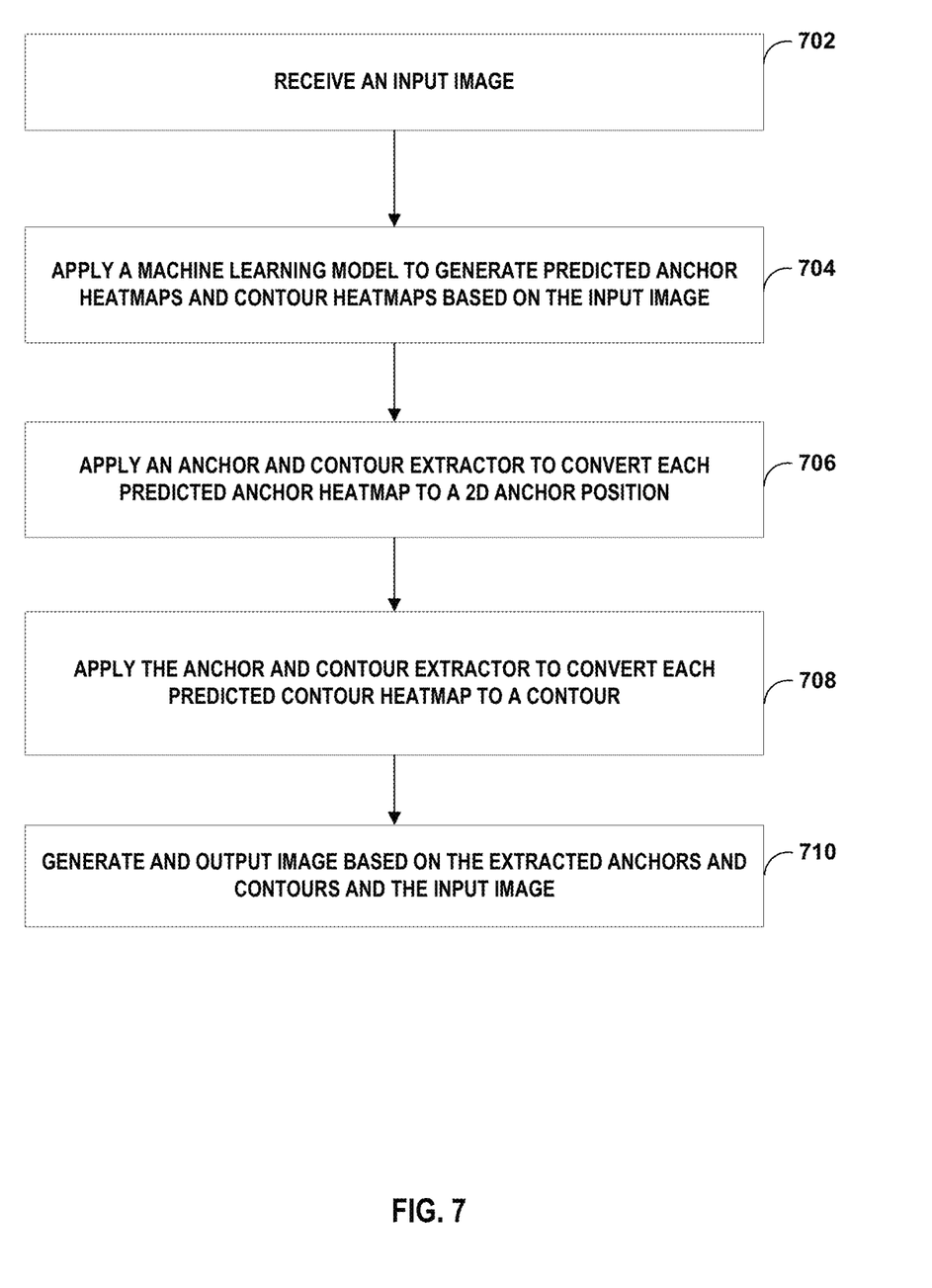
FIG. 7 is a flowchart illustrating an example operation for predicting and extracting facial anchors and facial contours from an input image using trained a ML model in accordance with the techniques of the disclosure.

FIG. 6 is a block diagram illustrating use of a trained ML model to predict and extract facial anchors and facial contours from an input image in accordance with techniques of the disclosure. FIG. 7 is a flowchart illustrating an example operation for predicting and extracting facial anchors and facial contours from an input image using trained a ML model in accordance with the techniques of the disclosure. For convenience, the examples of FIGS. 6 and 7 are high level illustrations of an ML trained in accordance with techniques of the disclosure that may be performed by some or all of components of FIGS. 1 and 2, such as ML model 104, 214, and AC extraction module 216.

In one example, trained ML model 604 receives input image 602, for example, a human face (702). Trained ML model 604 generates predicted anchor heatmaps and contour heatmaps based on the input image 602 (704). Anchor and contour extractor 608 (e.g., AC extraction module 216) converts each predicted anchor heatmap, (e.g., Eq. 1—Ha), to a 2D anchor position a=(ax, ay) (706), and each contour heatmap, (e.g., Eq. 2—Hc), into to a contour, c={si} (708). In one example for extracting anchors a local center-of-mass method may be used such that given an anchor heatmap Ha, the pixel p* with highest heat value is determined and an anchor position is computed as follows:

$$a = \Sigma_{p:\|p-p^*\| \leq \alpha} H_a(p) \cdot P / \Sigma_{p:\|p-p^*\| \leq \alpha} H_a(p) \quad \text{(Eq. 12)}$$

In one example for extracting contours, for each contour heatmap, Hc, a contourness map, C(Hc) and a contour orientation map, O(Hc), is computed using the closed-form solution to Eq. 6, described above, to generate a contour normal map N(Hc)=O(Hc)+π/2, and perform non-maximum suppression (NMS) on C(Hc) along directions specified by N(Hc), retaining just the maximal pixels which are then thresholded to obtain a binary contour mask, Bc. During NMS, the points in Bc are localized to subpixel accuracy by fitting a parabola along the normal direction specified by N(Hc). After NMS and thresholding, each contour has a width of 1 pixel. Connected components analysis may be performed with hysteresis to extract the contour trace, c, in the same way, for example, as Canny edge detection.

In one example, an output image 610 is generated based on the extracted anchors and contours and the input image 602 (710). The output image 610 may include extracted anchors and contours overlayed onto the input image 602 as illustrated on image 612.

Figure 8:
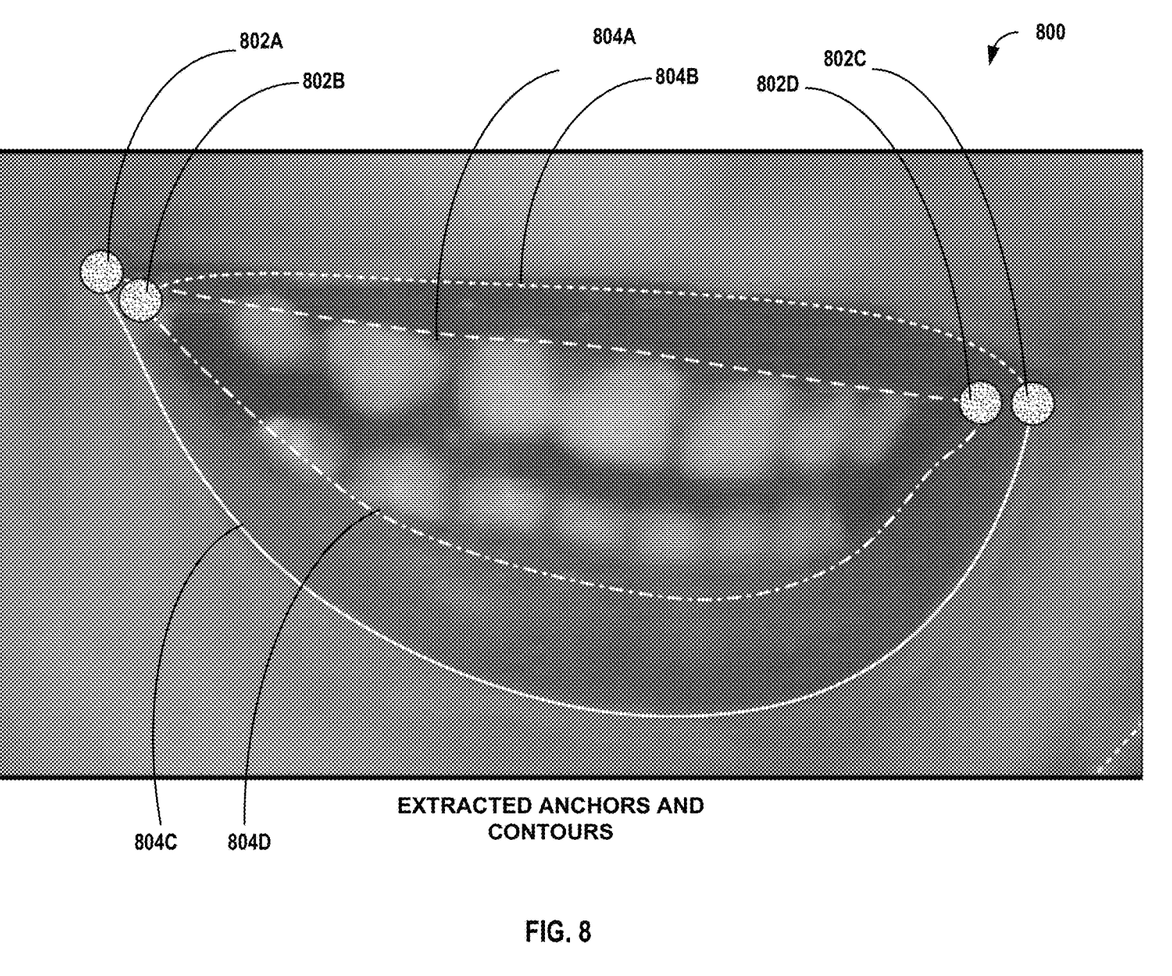
FIG. 8 is an image illustrating extracted predicted facial anchors and facial contours from an input image in accordance with techniques of the disclosure.

FIG. 8 is an image illustrating a portion of an output image (e.g., output image 228) from a computer device (e.g., computing device 200) using an AC estimation system (e.g., AC estimation system 211) to predict and extract facial anchors and facial contours from an input image in accordance with techniques of the disclosure. Output image 800 includes predicted anchors 802A-802D and predicted contours 804A-804D. In the example of FIG. 8, each predicted anchor and contour may be distinguished by a different visual annotation, such as dotted or dashed lines, etc. In other examples, the visual annotation may be by color, such as red for 804A, blue for 804B, and so on.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A system for performing facial alignment tasks, the system comprising:
    an input device configured to receive a training image comprising a plurality of pixels, wherein the training image is labeled with a plurality of facial landmarks; and
    a computation engine comprising processing circuitry for executing a machine learning system, wherein the machine learning system is configured to:
        generate, from the training image, one or more facial contour heatmaps, wherein each of the one or more facial contour heatmaps depicts an estimate of a location of one or more facial contours within the training image; and
        train a machine learning model to process the one or more facial contour heatmaps to predict the location of the one or more facial contours within the training image, wherein training the machine learning model comprises applying a loss function to minimize a distance between the predicted location of the one or more facial contours within the training image and corresponding contour data generated from facial landmarks of the plurality of facial landmarks with which the training image is labeled to improve an accuracy of the machine learning system in facial recognition.

2. The system of claim 1,
    wherein the loss function comprises a first loss function, and
    wherein the machine learning system is further configured to:
        generate, from the training image, one or more facial anchor heatmaps, wherein each of the one or more facial anchor heatmaps depicts an estimate of a location of one or more facial anchors within the training image; and
        train the machine learning model to process the one or more facial anchor heatmaps to predict the location of the one or more facial anchors within the training image, wherein training the machine learning model comprises applying a second loss function to minimize a distance between the predicted location of the one or more facial anchors and corresponding facial landmarks of the plurality of facial landmarks with which the training image is labeled.

3. The system of claim 2,
wherein to process the one or more facial anchor heatmaps, the machine learning system is configured to convert each of the one or more facial anchor heatmaps into a two-dimensional anchor position, and
wherein to process the one or more facial contour heatmaps, the machine learning system is configured to convert each of the one or more facial contour heatmaps into a contour, wherein each corresponding contour passes through one or more of the two-dimensional anchor positions.

4. The system of claim 1,
wherein the trained machine learning model is configured to:
receive one or more second facial contour heatmaps generated from an input image, wherein each of the one or more second facial contour heatmaps depicts an estimate of a location of one or more second facial contours within the input image; and
process the one or more second facial contour heatmaps to predict a location of the one or more second facial contours within the input image.

5. The system of claim 4, wherein the system further comprises a facial recognition unit configured to perform facial recognition based on the predicted location of the one or more second facial contours within the input image.

6. The system of claim 1,
wherein the contour data comprises contour landmark data, and
wherein the loss function comprises a landmark loss function configured to minimize a distance between the predicted location of the one or more facial contours and one or more contour landmarks of the contour landmark data.

7. The system of claim 1,
wherein the contour data comprises line-contour data, and
wherein the loss function comprises a line loss function configured to minimize a distance between the predicted location of the one or more facial contours and one or more line-contours of the line-contour data.

8. The system of claim 7, wherein the computation engine is further configured to connect adjacent facial landmarks of the plurality of facial landmarks with straight lines to generate the line-contour data.

9. The system of claim 1,
wherein the contour data is indicative of a distance of a pixel of the one or more facial contour heatmaps from one or more line-contours, and
wherein the loss function comprises a far loss function configured to assign a heatmap value of zero to pixels of the one or more facial contour heatmaps corresponding to pixels of the plurality of pixels of the training image that are a distance greater than a threshold distance value from the corresponding line-contour of the one or more line-contours.

10. The system of claim 1,
wherein the contour data comprises a contouress score for each pixel of each of the one or more facial contour heatmaps, the contouress score indicative of an existence of a facial contour passing through a pixel.

11. The system of claim 1,
wherein the loss function comprises a first loss function, and
wherein the input device is further configured to receive a synthetic training image comprising a second plurality of pixels, wherein the synthetic training image is labeled with a plurality of second facial landmarks and a plurality of second facial contours,
wherein the machine learning system is further configured to generate, from the synthetic training image, one or more second facial contour heatmaps, wherein each of the one or more second facial contour heatmaps depicts an estimate of a location of one or more second facial contours within the synthetic training image, and
wherein to train the machine learning model, the machine learning system is further configured to apply a second loss function to minimize a difference between the predicted location of the one or more second facial contours within the synthetic training image and corresponding locations of the plurality of second facial landmarks and the plurality of second facial contours with which the synthetic training image is labeled.

12. A method for performing facial alignment tasks, the method comprising:
receiving, by a computing device, a training image comprising a plurality of pixels, wherein the training image is labeled with a plurality of facial landmarks; and
generating, by the computing device, from the training image, one or more facial contour heatmaps, wherein each of the one or more facial contour heatmaps depicts an estimate of a location of one or more facial contours within the training image; and
training, by the computing device, a machine learning model to process the one or more facial contour heatmaps to predict the location of the one or more facial contours within the training image, wherein training the machine learning model comprises applying a loss function to minimize a distance between the predicted location of the one or more facial contours within the training image and corresponding contour data generated from facial landmarks of the plurality of facial landmarks with which the training image is labeled to improve an accuracy of the machine learning system in facial recognition.

13. The method of claim 12,
wherein the loss function comprises a first loss function, and
wherein the method further comprises:
generating, by the computing device, from the training image, one or more facial anchor heatmaps, wherein each of the one or more facial anchor heatmaps depicts an estimate of a location of one or more facial anchors within the training image; and
training, by the computing device, the machine learning model to process the one or more facial anchor heatmaps to predict the location of the one or more facial anchors within the training image, wherein training the machine learning model comprises applying a second loss function to minimize a distance between the predicted location of the one or more facial anchors and corresponding facial landmarks of the plurality of facial landmarks with which the training image is labeled.

14. The method of claim 12 further comprising:
receiving, by the computing device using the trained machine learning model, one or more second facial contour heatmaps generated from an input image, wherein each of the one or more second facial contour heatmaps depicts an estimate of a location of one or more second facial contours within the input image; and processing the one or more second facial contour heatmaps to predict a location of the one or more second facial contours within the input image.

15. The method of claim 12,
wherein the contour data comprises contour landmark data and line-contour data, and
wherein the loss function comprises a landmark loss function and a line loss function, the method further comprising:
minimizing, by the computing device using the landmark loss function, a distance between the predicted location of the one or more facial contours and one or more contour landmarks of the contour landmark data; and
minimizing, by the computing device using the line loss function, a distance between the predicted location of the one or more facial contours and one or more line-contours of the line-contour data.

16. The method of claim 12,
wherein the contour data is indicative of a distance of a pixel of the one or more facial contour heatmaps from one or more line-contours, and
wherein the loss function comprises a far loss function, the method further comprising:
assigning, by the computing device using the far loss function, a heatmap value of zero to pixels of the one or more facial contour heatmaps corresponding to pixels of the plurality of pixels of the training image that are a distance greater than a threshold distance value from the corresponding line-contour of the one or more line-contours.

17. The method of claim 12,
wherein the contour data comprises a contourness score for each pixel of each of the one or more facial contour heatmaps, the contourness score indicative of a proximity of a facial contour of the one or more facial contours passing through the respective pixel of each of the one or more facial contour heatmaps, and
wherein training the machine learning model further comprises:
comparing, by the computing device, each pixel of each of the one or more facial contour heatmaps to one or more heatmap templates, each of the one or more heatmap templates comprising a contour line orientation and a contour line width; and
calculating, based on the comparison, the contourness score for the respective pixel of each of the one or more facial contour heatmaps.

18. A method for performing facial alignment tasks, the method comprising:
receiving, by a computing device, an input image comprising a plurality of pixels;
generating, by the computing device, from the input image, one or more facial contour heatmaps, wherein each of the one or more facial contour heatmaps depicts an estimate of a location of one or more facial contours within the input image; and
processing, by a machine learning model, the one or more facial contour heatmaps to predict a location of the one or more facial contours within the input image,
wherein the machine learning model is trained by processing one or more training image facial contour heatmaps to predict a location of one or more training image facial contours within a training image by applying a loss function to minimize a distance between a predicted location of the one or more training image facial contours within the training image and corresponding contour data generated from facial landmarks of a plurality of facial landmarks with which the training image is labeled to improve an accuracy of the machine learning system in facial recognition.

19. The method of claim 18,
wherein the contour data is indicative of a distance of a pixel of the one or more training image facial contour heatmaps from one or more line-contours, and the contour data further comprises contour landmark data and line-contour data, and
wherein the loss function comprises a landmark loss function, a line loss function, and a far loss function, and wherein applying the loss function comprises:
minimizing, using the landmark loss function, a distance between the predicted location of the one or more training image facial contours and one or more contour landmarks of the contour landmark data;
minimizing, using the line loss function, a distance between the predicted location of the one or more training image facial contours and one or more line-contours of the line-contour data; and
assigning, using the landmark loss function, a heatmap value of zero to pixels of the one or more training image facial contour heatmaps corresponding to pixels of the training image that are a distance greater than a threshold distance value from the corresponding line-contour of the one or more line-contours.

20. A non-transitory, computer-readable medium comprising instructions for causing one or more programmable processors to:
generate, from a training image comprising a plurality of pixels and labeled with a plurality of facial landmarks, one or more facial contour heatmaps, wherein each of the one or more facial contour heatmaps depicts an estimate of a location of one or more facial contours within the training image; and
train a machine learning model to process the one or more facial contour heatmaps to predict the location of the one or more facial contours within the training image, wherein training the machine learning model comprises applying a loss function to minimize a distance between the predicted location of the one or more facial contours within the training image and corresponding contour data generated from facial landmarks of the plurality of facial landmarks with which the training image is labeled to improve an accuracy of the machine learning system in facial recognition.

* * * * *